United States Patent [19]

Andrjushin et al.

[11] 4,221,762
[45] Sep. 9, 1980

[54] APPARATUS FOR PREPARING CARBIDES

[76] Inventors: Alexandr I. Andrjushin, naberezhnaya M. Gorkogo, 4/22, korpus B, kv. 198; Sergei A. Kuznetsov; Nikolai P. Galkin; Jury N. Tumanov, poselok Moskvorechie, 113, kv. 61; Boris A. Kiselev, Vorobievskoe shosse, 13, kv. 50; Ion B. Sorkin, Scherbakovskaya ulitsa, 35, kv. 9; Vladimir I. Dobrovolsky, Proletarsky prospekt, 57, kv. 18; Jury P. Butylkin, prospekt Kalinina, 10/2, kv. 13, all of Moscow, U.S.S.R.

[21] Appl. No.: 873,494

[22] Filed: Jan. 30, 1978

Related U.S. Application Data

[63] Continuation of Ser. No. 683,510, May 5, 1976, abandoned.

[51] Int. Cl.$^2$ .................... B01J 4/00; B01J 17/00; C01B 31/36; H05B 9/02
[52] U.S. Cl. .................... 422/186; 13/26; 13/33; 156/615; 156/DIG. 68; 156/DIG. 86; 219/10.49 R; 219/10.79; 422/202; 422/233; 422/249; 422/251; 423/439; 423/442
[58] Field of Search ....... 156/615, DIG. 68, DIG. 86; 219/10.49, 10.57, 10.65, 10.67, 10.73, 10.79; 13/23, 26, 27, 33, 34; 423/291, 439, 442; 422/199, 232, 233, 202, 251, 249; 48/86 R; 202/251, 262, 269

[56] References Cited

U.S. PATENT DOCUMENTS

| | | | |
|---|---|---|---|
| 702,580 | 6/1902 | Muller | 202/251 X |
| 1,047,348 | 12/1912 | Wallmann | 48/86 R |
| 1,996,185 | 4/1935 | Wulff | 423/441 X |
| 3,375,073 | 3/1968 | McMullen | 23/262 X |
| 3,461,215 | 8/1969 | Reboux | 219/10.49 X |
| 3,582,528 | 6/1971 | Seale et al. | 13/27 |
| 3,703,601 | 11/1972 | Babel | 219/10.49 X |

*Primary Examiner*—Michael S. Marcus
*Attorney, Agent, or Firm*—Haseltine, Lake & Waters

[57] ABSTRACT

Apparatus for preparing carbides from a powdered charge of carbon and oxygen-containing compounds of elements that can form carbides comprises an inductor for the induction heating of the charge to the reaction temperature with continuous compacting thereof. The powdered charge is heated by inducing in it high-frequency currents uniformly throughout the entire induction volume to the depth of not less than the radius of the charge column. A tubular reactor is enclosed inside the inductor which is a high-frequency generator. The reactor is manufactured out of nonmagnetic material. The reactor has slots in its wall that are filled with a dielectric material. A loading device provided with a pusher is mounted at a top portion of the reactor, and an unloading device provided with a valve and a receptacle is located at the bottom portion of the reactor.

8 Claims, 2 Drawing Figures

APPARATUS FOR PREPARING CARBIDES

This is a continuation of application Ser. No. 683,510 filed May 5, 1976, now abandoned.

FIELD OF THE INVENTION

This invention relates to apparatus for preparing refractory materials, and more particularly for preparing carbides.

The invention can be used in the manufacture of carbides from powdered charge comprising carbon and oxygen-containing compounds of elements that can produce carbides.

The invention can be most effectively used in the manufacture of boron carbide.

Boron carbide is used in the manufacture of nuclear reactor rods, elements for biological protection of the reactor, heat-stressed parts of space apparatus, turbine blades, abrasive materials, protective materials, and can be used also in electrical engineering and electronics.

The requirements for boron carbide used in nuclear reactors, high-temperature apparatus, electrical engineering and electronics, with respect to their physical characteristics (granule size and shape, specific surface, etc), with respect to basic components (boron and carbon), and also with respect to contents of admixtures that pass into carbides from the starting materials and the materials of the furnace, are very high.

The properties of boron carbide are very important for the behavior of future articles in the active zone of nuclear reactors, stability and function of coats, operation of pick-ups, etc. Boron carbide should therefore be produced in the solid state without melting, since in the melting process boron carbide is destroyed peritectically and becomes contaminated with free carbon.

The methods known in the prior art are based on the reaction of carbothermic reduction of boric anhydride

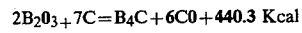

$$2B_2O_3 + 7C = B_4C + 6CO + 440.3 \text{ Kcal}$$

and only differ in the heating method and the design of the unit in which the process is realized.

Known in the prior art is also a method for preparing boron carbide in coreless resistance furnaces.

A coreless resistance furnace is a shaft lined on the inside with a refractory (chamotte) material and having a removable front wall and two horizontal graphite electrodes connected to source of electric power (transformer).

The method is realized as follows.

The furnace is loaded with a mixture of boric acid and carbon, in the form of black, and the charge is then heated. In order to ensure better contact between carbon particles and also to increased the electric conductivity of the charge, it is compacted manually in the space between the electrodes. The charge is gradually heated and boron carbide is formed in the space between the electrodes. The beginning of the process is accompanied by intense liberation of carbon monoxide, and the charge shrinks considerably, as a result of which gaps are formed between the electrodes and the charge, the current stops flowing and the heating process is discontinued. To preclude this, new portions of the charge are added and compacted. The heating process is suspended for this period of time and this makes the whole process intermittent.

In the process of heating the charge, atmospheric air enters the furnace oxidizing and nitriding the charge. Furthermore, as the molten charge comes in contact with the refractory lining of the furnace, boron carbide gets contaminated with the components of the refractory material. The quality of the obtained boron carbide is thus deteriorated.

Since the density of current is maximum along the electrode axis and diminishes towards the periphery, the temperature inside the furnace decreases with the distance from the electrode axes owing to which the obtained boron carbide is non-uniform in composition and structure.

This process for preparing boron carbide requires much labor to load the furnace and to separate boron carbide from unreacted and partly reacted components.

The yield of boron carbide with this method is only 30–50 percent of theory.

Known also is a method for preparing boron carbide in electric-arc furnaces.

An electric-arc furnace is a welded metallic casing lined on the inside with refractory chamotte. Three electrodes are suspended in the shaft. Crushed return (partly reacted) charge is placed on the bottom of the furnace (200–250 kg) to prevent sticking of the resulting boron carbide to the bottom and contamination of boron carbide with carbon. The main charge, consisting of boric acid and graphite powder, is then placed into the furnace.

The specific feature of the process is that the charge is heated to a temperature above the point at which boron carbide melts and boron carbide is crystallized out of the liquid phase.

The melting process is effected with continuous delivery of the charge. In the melting process the charge melts only in the vicinity of the electrodes, while at a distance from them it is in the solid state. The molten portion is stirred with a pole. Non-molten and unreacted charge is added to the new charge.

On the termination of the melting process, the electrodes are lifted from the furnace and the molten unreacted charge is unloaded together with the resulting boron carbide. The molten mass is cooled in air for 8–10 hours, and then boron carbide is separated manually from the unreacted material. Boron carbide is graded manually, crushed with a hammer into fragments and delivered to the concentration step of the process.

The temperature conditions in the furnace are nonuniform. In the electrode zone, the temperature exceeds the point of peritectic destruction of boron carbide (2,200° C.) and in the direction of the shaft walls, the temperature drops. As a result, free carbon content of boron carbide fluctuates.

Three grades of boron carbide are distinguished with respect to the free carbon content: third grade material (obtained in the maximum temperature zone) contains to 30 percent of free carbon, second grade material (obtained in the intermediate zone) contains to 18 percent, and first grade boron carbide (obtained in the low-temperature zone, i.e. at the bottom of the shaft and at its walls) contains to 3 percent of free carbon.

Moreover, as the charge is heated, atmospheric air enters the furnace, oxidizing and nitriding the charge, and further more it becomes contaminated with the components of the refractory lining material as the molten charge comes in contact with the walls of the shaft.

As a result, the quality of the obtained boron carbide is deteriorated.

Known in the prior art is also a method for the production of boron carbide out of a charge containing boric anhydride, and carbon in the form of black, in graphite-tube furnaces.

A graphite-tube furnace is a tube coated on the outside with heat insulation. The graphite tube is connected to a source of electric power.

A charge containing boric anhydride and carbon black is dehydrated, briquetted, and loaded into graphite cartridges that are pushed along the tube at a rate sufficient to complete the reaction in which boron carbide is produced.

However, the process of boron carbide formation under such conditions requires great energy consumption. Moreover, under the effect of electric current graphite tubes are quickly destroyed.

This method of producing boron carbide requires much manual labor for loading and unloading the charge into and from the graphite tubes.

Known in the prior art is a method for preparing boron carbide from powdered charge comprising carbon in the form of black, and boric anhydride.

The method consists in induction heating of the charge to a temperature at which the reaction occurs, with continuous compaction of the charge.

Known also is a unit for realizing this method, consisting of a graphite reactor mounted on a frame. A loading device is connected to the upper portion of the unit (the device has a pushing rod), and an unloading opening communicates with the bottom of the unit.

The graphite reactor is actually a tube.

The charge comprising carbon black and boric anhydride is loaded with a pusher into the graphite reactor, the latter is placed in a high-frequency generator inductor, and induction currents heat the charge.

The charge inside the reactor is heated as a result of heat transfer and radiation from the graphite walls of the reactor. The radiation propagates both inside and outside the reactor, and a considerable part of electric energy is irrecoverably dissipated.

Since heat in the graphite reactor moves from the walls toward the center, the temperature in the charge decreases from the periphery toward the center. As a result the composition and the structure of the resulting carbide are nonuniform.

The resulting carbide should be separated manually from the unreacted or only partly reacted material, and it becomes therefore difficult to mechanize and automate the process.

As the charge is heated and carbide is formed, large quantities of carbon monoxide are liberated, hollow cavities being thus formed in the charge. The mass of the substance inside the induction space shrinks and the intensity of heat transfer from the reactor walls to the charge accordingly decreases. As the charge is compressed by the pusher, the reactor walls are subject to mechanical stresses and often break down. Hence frequent replacement of the reactor and disruption of continuity of the process.

SUMMARY OF THE INVENTION

A specific object of the invention is to provide apparatus for preparing carbides, that ensures continuous mechanized and automated production of the carbides.

Another important object of the invention is to provide apparatus that makes it possible to obtain carbides which are in structure and composition.

Still another object of the invention is to provide apparatus for preparing carbides, and the unit for realizing that eleminates the loss of waste, and decreases the cost of the obtained product.

These objects have been attained by apparatus carrying out a method for preparing carbides from a powdered charge of carbon and oxygen-containing compounds of elements that can form carbides, comprising induction heating the charge to the temperature of the reaction with continuous compression of the charge, in which, according to the invention, the powdered charge is heated by directly inducing in it high frequency currents uniformly throughout the entire induction volume to a depth of not less than the radius of the charge column.

The apparatus comprises a tubular reactor mounted on a frame and placed inside an inductor of a high-frequency generator, a loading device a connected to the upper portion of said reactor having a pusher, while to the lower part of said reactor, having an unloading device receptacle is connected, and according to the invention the tubular reactor is manufactured out of a non-magnetic metal and having a wall with slots filled with a dielectric material, while the unloading opening has a valve.

Since the powdered charge is heated directly with currents induced in it uniformly throughout the entire volume to a depth not less than the radius of the charge column, the resultant carbide is uniform with respect to its composition and structure.

The depth of penetration of induced currents into the charge is determined by the frequency of the electromagnetic field and the conductivity of the charge. The frequency of the generator is selected in compliance with the conductivity of the charge so that the induction currents can penetrate the charge to the center. The conductivity of the charge is controlled by selecting the appropriate carbon component (graphite, carbon black) and the degree to which the charge is compressed. Since the induction currents penetrate the charge to the center of the column, the temperature is uniform throughout the entire section of the column and this ensures the conditions for preparing carbide having uniform structure and composition.

Since the whole mass of the charge in the inductor zone is heated simultaneously and to constant temperature, the entire material in the inductor zone, except the thin layer bordering the reactor walls is converted into carbide.

Since the charge is compressed in the reactor during the carbidization process by adding new portions of the charge into the reaction zone, the material is compressed and carbide is obtained in the form of a block.

97 percent of the entire charge reacts with conversion into carbide and carbon monoxide, and no wastes are produced in the process. The thin wall-bordering layer is readily separated from the carbide block and loaded into the reactor again.

The free carbon content of the carbide obtained by the direct induction heating in a dielectric reactor decreases since the synthesis of carbide is realized at a reaction temperature which is below the point at which the carbide melts. This is attained automatically as a result of increased conductivity of carbide compared with conductivity of the starting and intermediate materials, and as a result of decreased depth of penetration of induction currents inside the material. The induction currents are concentrated at the surface of the column to prevent the synthesized carbide from overheating, melting, and being destroyed.

In order to preclude contamination of boron carbide with the reactor material, the latter is cooled.

The tubular reactor, according to the invention, is made out of a non-magnetic material and has slotted walls filled with a dielectric material (quartz, corundum, boron nitride, etc) intended for penetration of electromagnetic energy inside the reactor, as a result of which the reactor walls remain cold and are not destroyed, and hence the obtained boron carbide is not contaminated with the material of the reactor walls.

Moreover, according to the invention, the reactor is connected air-tightly to the loading device and the receptacle so that atmospheric air does not penetrate into the reactor. Since the loading device having a pusher is connected to the upper portion of the reactor, and the receptacle is connected to the lower portion of the reactor provided with an unloading opening, the process of preparing carbide is a continuous one and conditions are provided for automation and mechanization of this process.

Manual labor is eliminated in the proposed method and the number of the personnel engaged in operating the unit is also reduced. As a result of these advantages, as well as due to decreased floor area and improved quality of the obtained carbide, the cost of the end product decreases 1.5-2 times.

It is recommendable that the inner surface of the tubular reactor have the form of a truncated cone widening toward the receptacle. This decreases the friction of the charge and the formed carbide against the reactor walls and prevents disruption of the process.

It is desirable that the tubular reactor be air-tightly connected to a condenser located on the same frame together with the tubular reactor. This precludes contamination of the environment with the oxides of the elements that are used for preparing carbide and that are evaporated in the process of heating.

It is also desirable that the loading device be a hopper with its lower part narrowing to the size of the tubular reactor, with a pusher made as a coaxial piston, the diameter of which is somewhat less than the diameter of the tubular reactor, and having a coaxially located device that prevents arching of the charge in the furnace. As a result, the charge is loaded into the reactor by gravity and is compacted over the entire surface.

It is recommendable also that the receptacle should comprise at least two hoppers (located one above the other) having a shutter at the point of their air-tight connection. The seal prevents air penetration into the reactor.

It is desirable that the upper hopper have a device for cutting off the formed carbide from the charge and a device for crushing the carbide. This facilitates the process of carbide unloading.

The proposed apparatus ensures continuous mechanized and automated production of carbides.

Moreover, the proposed invention provides for an improved carbide which is uniform with respect to its composition and structure.

Using the proposed invention will rule out undue loss with the waste and decrease the cost of the obtained carbide

BRIEF DESCRIPTION OF THE DRAWINGS

For a better understanding of the invention, the following example of its practical embodiment are given by way of illustration with reference to the appended drawings in which.

DETAILED DESCRIPTION

Figure 1:
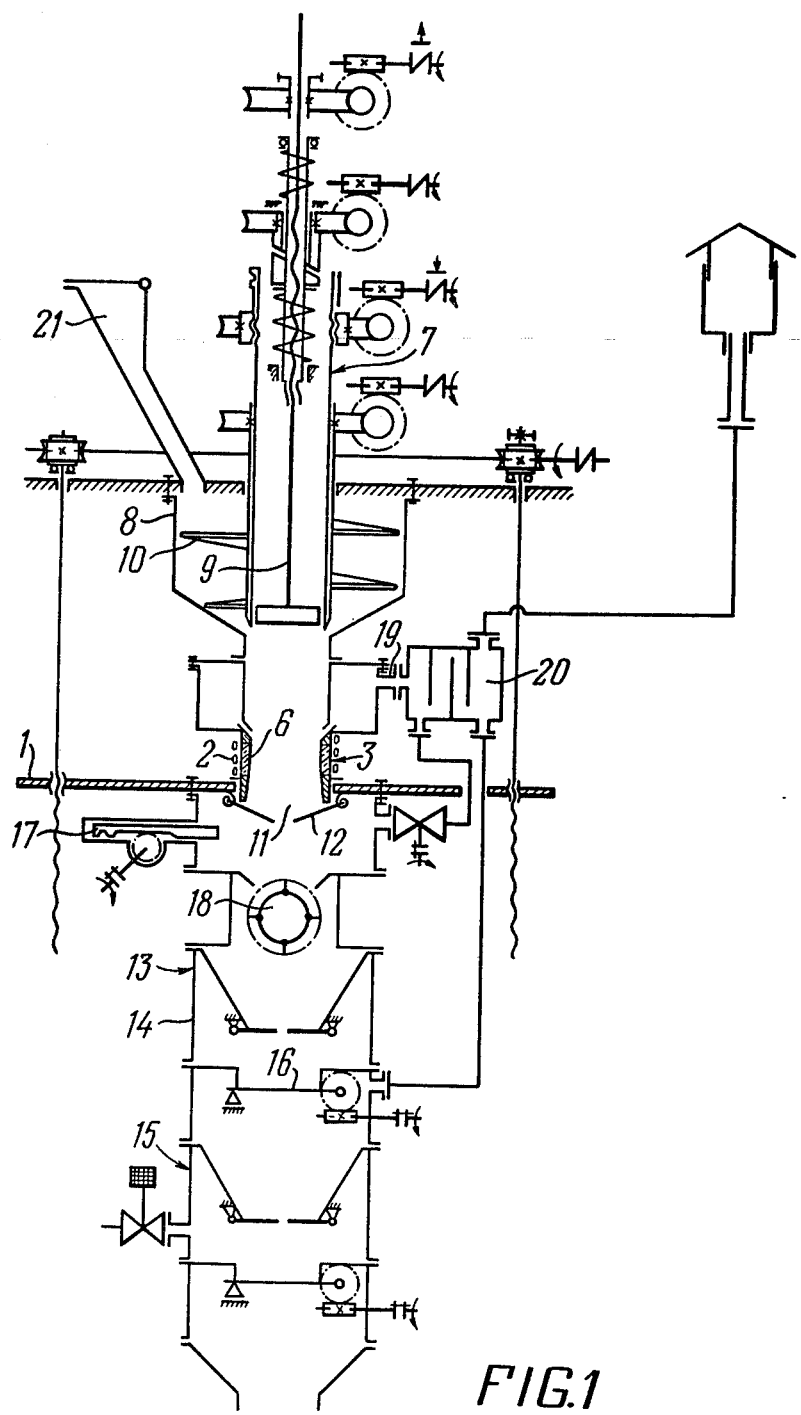
FIG. 1 is a sectional view of a unit according to the invention.

The proposed method for preparing carbides from powdered charge comprising carbon and oxygen-containing compounds of elements capable of forming carbides, consisting in induction heating of the charge to the reaction temperature with continuous compressing the charge, is realized by heating the powdered charge by directly inducing in it high frequency currents uniformly throughout the entire volume to the depth of not less than the radius of the column.

The proposed method will become subsequently clear from a detailed description of the apparatus for its practical realization and of the operation of this apparatus.

The unit is intended for the production of carbides from powdered charge consisting of carbon and oxygen-containing compounds of elements capable of forming carbides (for example boric anhydride).

The apparatus comprises a tubular reactor 3 mounted on frame 1 (FIG. 1) and placed in an inductor 2 of a high-frequency generator (not shown in the Figure). The tubular reactor 3 (FIG. 2) according to the invention is manufactured from a non-magnetic metal, e.g. copper, and has a cooled wall 4. The wall 4 is cooled so that the reactor 3 is not heated from the charge inside the reactor 3.

The wall 4 of the tubular reactor 3, according to the invention, is made with slots 5 that are filled with a dielectric material (for example quartz, corundum, or boron nitride) through which the induction currents enter the tubular reactor 3.

The inner surface 6 of the tubular reactor is made in the form of a truncated cone widening downwards. This reduces friction between the formed carbide and the wall 4 of the reactor 3 and thus prevents disruption of the process continuity.

A loading device 7 is connected to the upper portion of the tubular reactor 3 (FIG. 1).

The loading device 7 comprises a hopper 8 narrowing downwards to the diameter of the tubular reactor 3. A pusher 9 located inside the hopper 8, is constituted as a piston the diameter of which is somewhat less than that of the tubular reactor 3. Also inside the hopper is a device 10 that prevents charge arching. The loading device 7 has a loading cone 21.

Owing to this design of the loading device 7, the charge enters the reactor by gravity and is compressed in it essentially over the entire surface thereof.

To the lower portion of the tubular reactor 3, having an unloading opening 11 a receptacle 13 is connected.

The unloading opening 11, according to the invention, is closed with a butterfly spring-loaded valve 12 which is opened by the pressure of the emerging carbide.

The receptacle 13, according to the invention, is made in the form of two sealed hoppers 14 and 15 installed one atop the other, and having a shutter 16 at the point of their junction. The upper hopper 14 is intended for crushing the formed carbide, and the lower hopper 15 for cooling the carbide. The upper hopper 14 has means 17 for cutting off the formed carbide from the charge and means 18 for crushing this carbide. This is necessary to facilitate carbide unloading and to preclude penetration of atmospheric air into the reactor chamber.

In the example under consideration, the receptacle is made in the form of two hermetic hoppers installed one over the other, but the receptacle may comprise three or more hoppers installed one over another and separated by shutters.

The tubular reactor 3 is connected by an air-tight pipeline 19 to a condenser 20 located on the same frame 1 with the tubular reactor 3. This is necessary to prevent contamination of the environment with oxides of the elements that are used for preparing carbides and that are evaporated in the process of heating.

Figure 2:
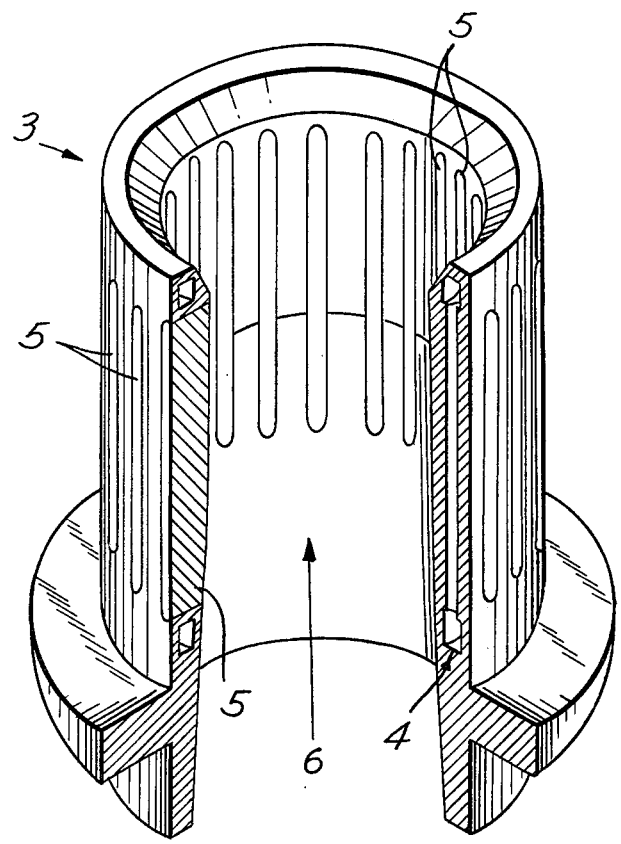
FIG. 2 is a broken away perspective view of a tubular reactor according to the invention.

Slots 5 in a reactor 3 according to FIG. 2 have a height less than that of the reactor.

The unit operates as follows.

Through the loading cone 21 the charge is delivered into the hopper 8 of the loading device 7. In the hopper 8 the charge is loosened by the device 10 that prevents arching of the charge. When the pusher 9 is in its extreme upper position the charge is delivered into the tubular reactor 3 and fills it.

The pusher 9 of the loading device 7 continuously compacts the charge. The degree of the charge compaction is controlled by the spring-loaded valve 12. As soon as the required degree of compactness is attained the generator is actuated, electromagnetic oscillations are generated in the inductor 2, and heating of the charge is started.

Induction currents penetrate through slots 5 in the wall 4 ofthe reactor 3 to a depth not less than the radius of the charge column and heat the compacted charge uniformly throughout its entire volume.

As the reaction goes on, voids are formed in the charge owing to liberation of carbon monoxide. Under the action of the pusher 9 these voids are filled with the molten charge. In 20–30 minutes the entire charge turns into boron carbide sponge except for the thin layer, measuring 2–3 mm, that borders the cold wall 4 of the reactor 3.

The heating process is effected with continuous delivery of the charge and with the continuously operating pusher 9.

The formed sponge, acted upon by the pusher, exerts pressure on the spring-loaded valve 12 opens it, and enters the upper hopper 14 of the receptacle 13. In this hopper 14, the sponge is crushed by the device 17 to separate carbide and the charge, and the carbide is crushed into pieces of 10–15 mm size by the device 19, which is actuated at the moment when the sponge is separated from the charge. Carbide lumps move into the lower hopper 15 of the receptacle where they are cooled. On complete cooling, carbide lumps are unloaded from the receptacle 13.

EXAMPLE 1

A charge containing 61.0 percent by weight of $B_2O_3$, 37.4 percent by weight of C and 1.6 percent by weight of water is loaded through the loading cone into a hopper of the loading device, wherefrom the charge is delivered into the tubular reactor.

The pusher of the loading device compacts the charge and as the required degree of compression is attained, the generator is actuated. Its oscillatory power is 50 kW, and frequency is 2.5 MHz. The consumption of the charge is 6 kg per hour.

The process yields boron carbide containing the following components, in percent by weight: $B_{total}$, 72.6; $B_2O_3$, 4.2; $C_{total}$, 23.2; of which free carbon is 5.6.

This carbide contains boron in quantities less than stoichiometrically required in $B_4C$. Moreover, it contains much free carbon.

The obtained boron carbide can be used most effectively in the manufacture of abrasive articles.

EXAMPLE 2

A charge containing 61.2 percent by weight of $B_2O_3$, 36.7 percent by weight of C, and 2.1 percent by weight of water is loaded through the loading cone into the hopper of the loading device, wherefrom it enters the tubular reactor.

The pusher of the loading device continuously compacts the charge and as the required degree of compression is attained the generator is actuated. Its oscillator power is 55 kW, and frequency is 2.6 MHz.

The charge consumption is 5.2 kg per hour.

The obtained boron carbide contains $B_{total}$ 79.9 percent by weight, $C_{total}$ 20.1 percent by weight, of which 0.2 percent by weight is free carbon.

The obtained boron carbide has a composition close to stoichiometric; the total quantity of admixtures is less than 1 percent by weight.

This boron carbide can be used most effectively in processes of pressing and sintering articles, and in coating processes.

EXAMPLE 3

A charge containing 68.8 percent by weight of $TiO_2$ and 31.2 percent by weight of C is loaded through the loading cone into the hopper of the loading device wherefrom the charge enters the tubular reactor and fills it.

The pusher of the loading device compacts the charge and as the required degree of compression is attained the generator is actuated. The oscillatory power of the generator is 23 kW, and frequency is 11 MHz.

The charge consumption is 1.4 kg per hour.

The obtained titanium carbide contains total titanium 81.1 percent by weight and carbon 19.9 percent by weight of which free carbon is 0.4 percent by weight.

Titanium carbide of this composition can be most effectively used in the manufacture of refractory articles (crucibles, heaters, etc).

Tests have shown that carbides of various elements obtained by the herein-proposed method have the required range of physico-chemical properties. In the manufacture of ceramic articles from boron carbide and titanium carbide, the density was very close to theoretical.

We claim:

1. An apparatus for preparing carbides comprising a frame means; a high-frequency generator means including an inductor; an upright tubular reactor means mounted on said frame means and disposed within said inductor, said reactor means being made from non-magnetic metallic material; said reactor means having a wall whose inner surface is in the form of a truncated cone widening downwards, said wall being provided with slots therein of a height less than the height of the wall; dielectric material means filling said slots; a loading means coaxially attached to a top portion of said tubular reactor means for supplying material to said reactor means, said loading means including compacting means for compacting the material supplied to said reactor means by applying pressure thereto, said tubular reactor means having a discharge opening at the lower end thereof; spring-loaded valve means at said discharge opening resiliently closing said opening and yieldably resisting the pressure applied by the compacting means to the material in the reactor means; a receptacle means attached to the lower portion of said tubular reactor means; and means for separating carbide formed in the reactor and discharged under the pressure of the compacting means from the materials in the reactor means, the separated carbide falling into the receptacle means.

2. Apparatus as claimed in claim 1 comprising a condenser means mounted on said frame means, and means connecting said condensor means to said tubular reactor means in air-tight fashion.

3. Apparatus as claimed in claim 1 in which said loading means comprises a hopper means narrowing to the diameter of said tubular reactor means at said top portion, the compacting means including a charge pusher means coaxially disposed relative to said hopper means, said charge pusher means being constituted as a piston means having a diameter less than that of said tubular reactor means, said loading means further comprising means for preventing arching of the charge in said hopper means coaxially disposed therein, said means for preventing arching of the charge having a lower portion spaced from the bottom of said hopper means to form a concentric slot therewith.

4. Apparatus as claimed in claim 1 comprising means for cooling said wall of the reactor means.

5. Apparatus as claimed in claim 1 in which said receptacle means comprises at least two sealed hopper means installed one above the other, shutter means at the junction of said two hopper means, crushing means in the upper hopper means for crushing carbide therein and cooling means in the lower hopper means for cooling the crushed carbide received from the upper hopper means.

6. Apparatus as defined in claim 5 in which said means for separating the carbide is disposed in said upper hopper means.

7. Apparatus as claimed in claim 1 wherein the loading means continuously supplies material to the reactor means and the compacting means continuously applies pressure to the material supplied to the reactor means.

8. Apparatus as claimed in claim 7 wherein said loading means comprises a hopper means with vertical feed of material to said reactor means so that compaction in the reactor is supplemented by gravity.

* * * * *